May 5, 1959
A. H. WINKLER
2,884,916
FUEL SUPPLY SYSTEM
Filed Dec. 13, 1957
4 Sheets-Sheet 1
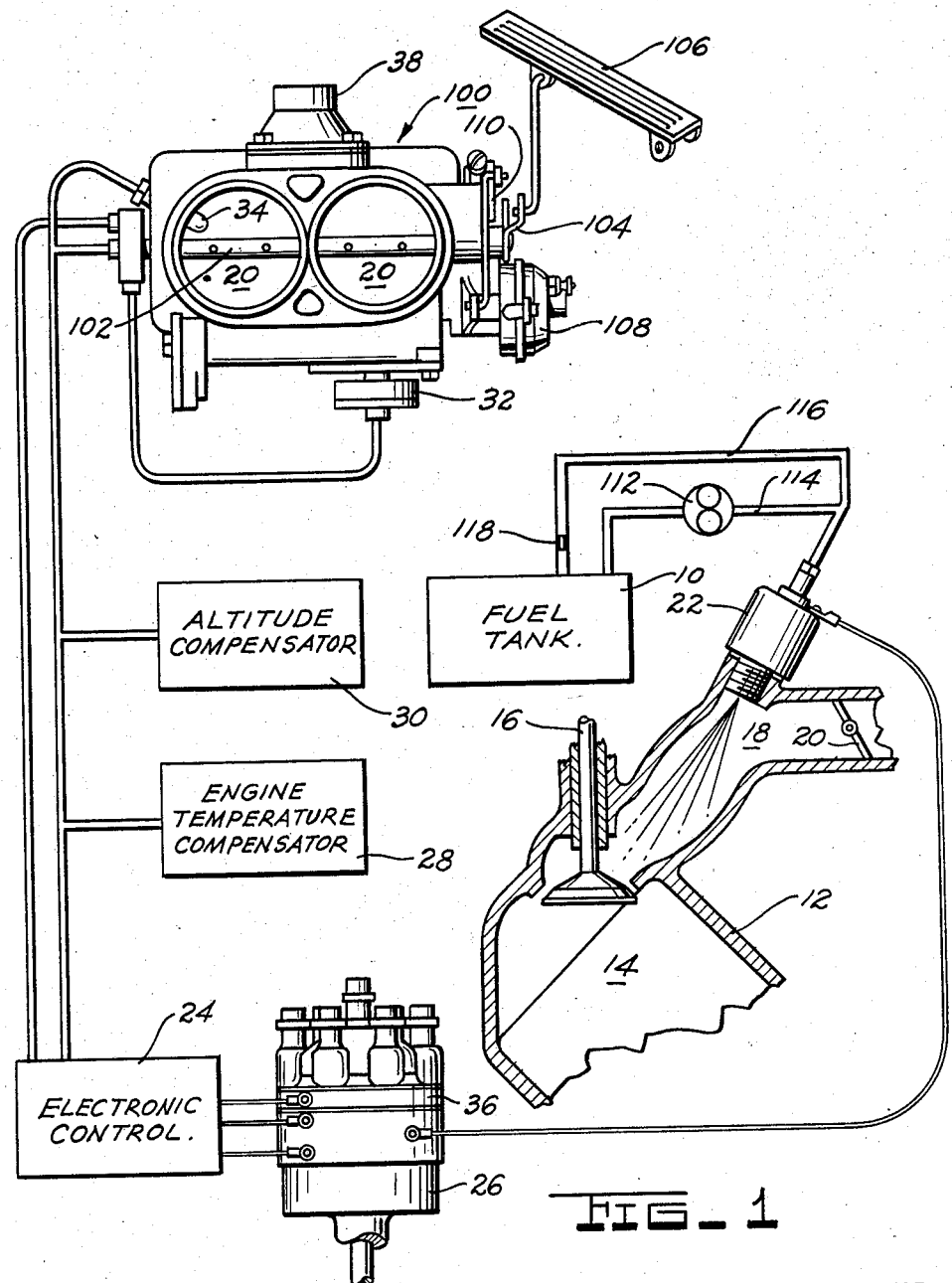
FIG_1
INVENTOR.
ALBERT H. WINKLER
BY
ATTORNEY.

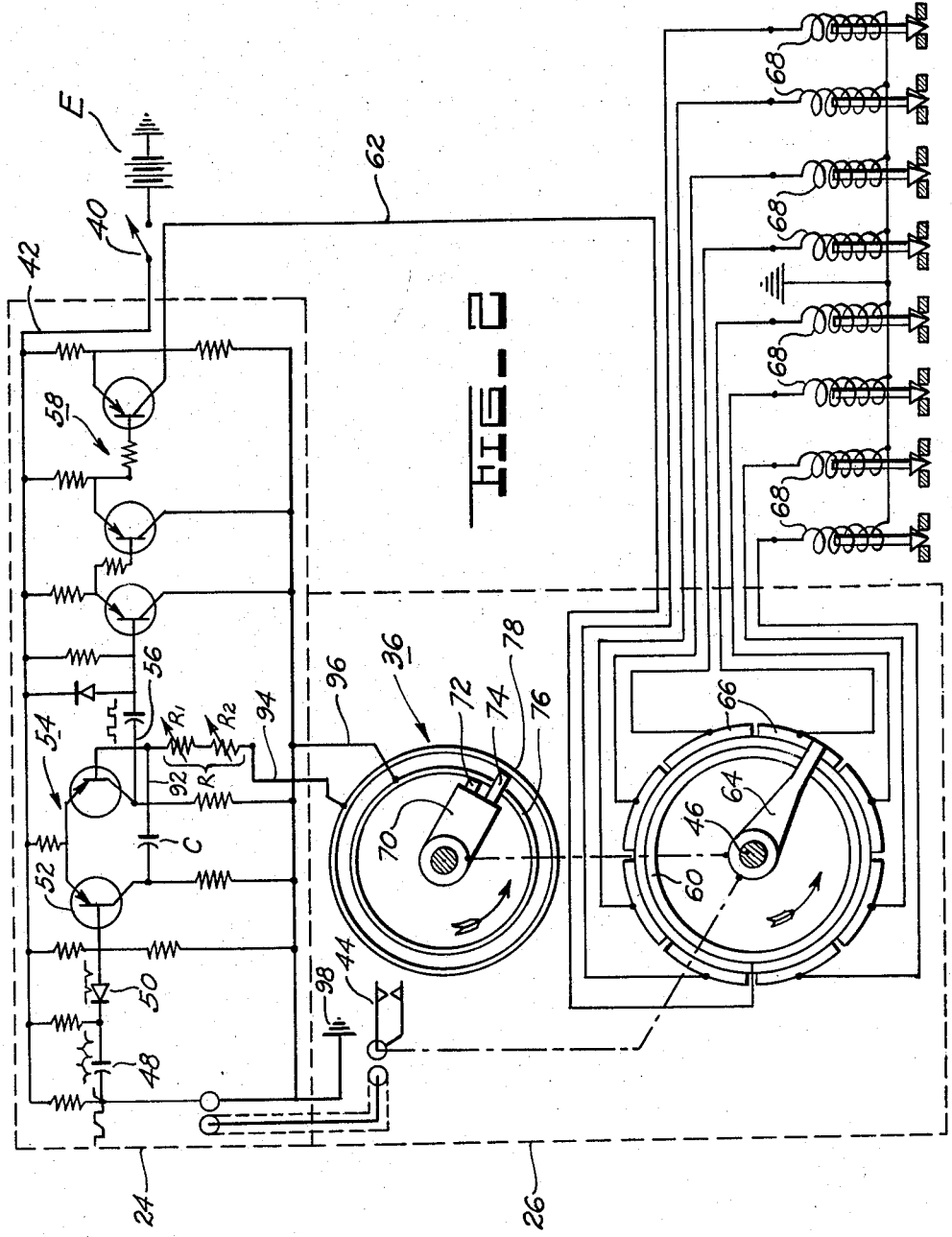

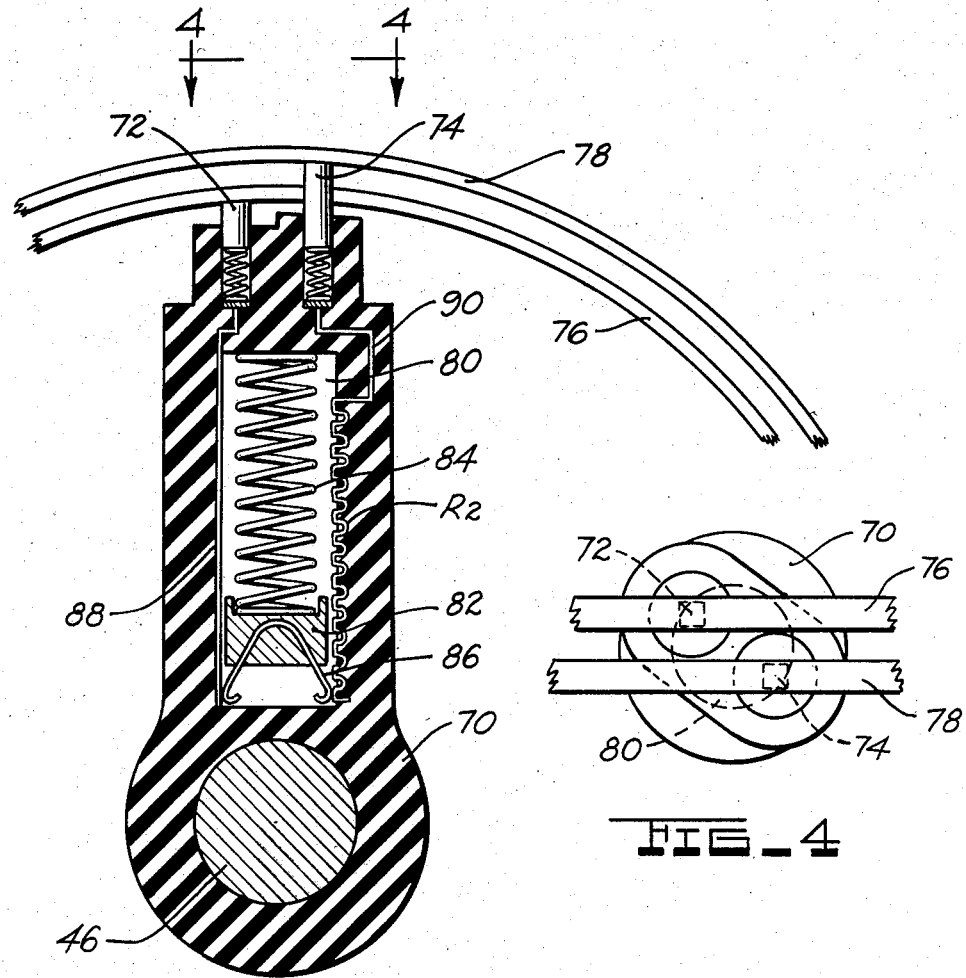

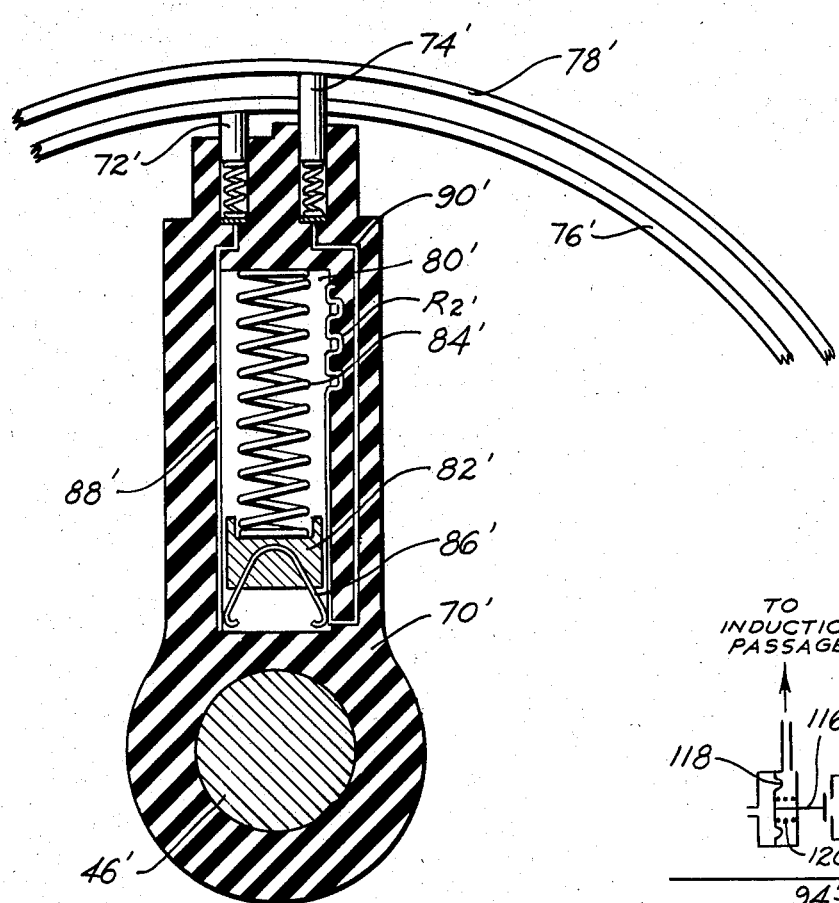
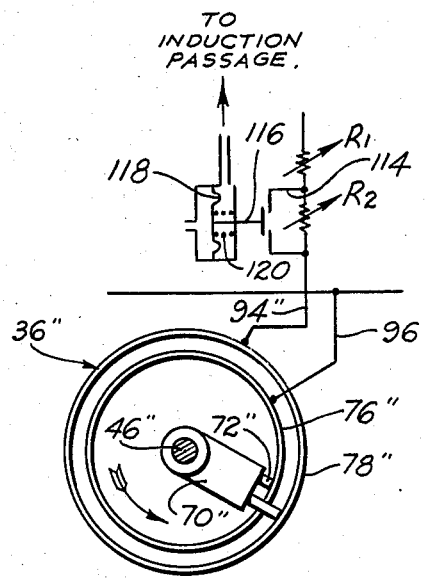
FIG_5
FIG_6
INVENTOR.
ALBERT H. WINKLER

United States Patent Office 2,884,916
Patented May 5, 1959

2,884,916

FUEL SUPPLY SYSTEM

Albert H. Winkler, Elmira, N.Y., assignor to Bendix Aviation Corporation, South Bend, Ind., a corporation of Delaware Application December 13, 1957, Serial No. 702,620

6 Claims. (Cl. 123—119)

The present invention relates generally to fuel supply systems for internal combustion engines and more particularly to a control for such a system for modulating the quantity of fuel supplied to the engine as a function of engine speed.

A fuel supply system of the general type to which my invention is applicable is described and claimed in U. S. application Serial No. 637,852 filed February 4, 1957 in the names of Robert W. Sutton, Stephen G. Woodward and Curtis A. Hartman assigned to the assignee of the present invention. In such a system the quantity of fuel supplied to the engine is controlled by periodically energizing an electric fuel valve in synchronism with the engine and by varying the time duration that the valve remains open to supply fuel. The start of injection is controlled by a switch operated as a function of engine speed; and the time duration of the injection is regulated as a function of engine operating conditions such as induction passage pressure, engine temperature, ambient temperature, and ambient pressure. In such a system the timing device that modulates the duration the valves are open per cycle are insensitive to the frequency of actuation i.e. for constant engine operating conditions the time duration of injection will remain constant irrespective of engine speed and the number of times or frequency that the timing device is actuated.

On some engines with which the above system has operated, it has been found that the fuel flow requirement to the engine varies as a function of changes in engine volumetric efficiency and/or fuel delivery variations caused by fuel line pulsations and movable parts in the system which vary with engine speed.

It is accordingly an object of the invention to provide a control for a fuel supply system to modify the time duration of injection to compensate for changes in engine volumetric efficiency and/or fuel delivery variations.

It is a further object of the invention to provide a control for an electronic fuel injector to modify the time duration of injection as a function of engine speed.

Other objects and advantages of the invention will be readily apparent from the following detailed description taken in connection with the appended drawings in which:

Figure 1 is a schematic view of my fuel injection system;

Figure 2 is a circuit diagram of the electronic control shown in Figure 1;

Figure 3 is a cross-sectional view of the compensating device shown in Figure 2;

Figure 4 is a view of Figure 3 taken in the direction of the arrows 4—4;

Figure 5 is another embodiment of the compensating device shown in Figure 3; and Figure 6 is a fragmentary schematic view showing a modification of the compensating device shown in Figure 2.

Referring now to the drawings and more particularly to Figure 1, numeral 10 designates a source of fuel, 12 an engine having a cylinder or combustion chamber 14, an inlet valve 16, an induction passage 18 with a throttle valve 20 mounted therein and a fuel injector 22 mounted thereon.

The injectors 22 are arranged to be actuated by an electronic control 24 which is triggered by and connected to an appropriate injector 22 by a trigger-distributor unit 26. Unit 26 triggers or energizes the electronic control 24 which then remains energized for a controlled time duration. The output of the control 24 is connected to an appropriate injector 22 through unit 26 whereby the injector discharges fuel for the time duration that the electronic control remains energized.

The time that electronic control 24 remains energized is regulated by various sensory elements including engine temperature compensator 28, altitude compensator 30, induction passage pressure responsive element 32, ambient air temperature compensator 34 and engine speed compensator 36. The time duration of injection may also be regulated by an acceleration control 38.

Referring now to Figure 2, E designates a source of electrical power connected through a switch 40 and conductor 42 with a switch 44 located in injector-distributor unit 26. Switch 44 is mounted for actuation by shaft 46 which is adapted to be driven as a function of engine speed and when actuated produces a series of pulses which are shaped by capacitor 48 and rectifier 50 into a series of negative going voltage spikes which are effective to trigger a normally non-conducting transistor 52 in multi-vibrator unit 54. The multi-vibrator 54 produces a pulse in conductor 56, the width of which is a function of the time constant RC. The engine temperature compensator 28, altitude compensator 30, induction passage pressure compensator 32, engine temperature compensator 34 and acceleration control 38 are shown schematically in Figure 2 by the variable resistor designated $R_1$. The engine speed compensator 36 is shown schematically in Figure 2 as $R_2$. The resistances $R_1$ and $R_2$ are collectively referred to as R. While for purposes of illustration the time constant is shown as an RC combination with the compensating members varying the resistance portion of the time constant it is to be understood that inductive members may also be utilized and that the compensating members may vary capacitive and inductive elements as well as the resistive elements. The pulses in conduit 56 are amplified by the cascaded transistors in amplifier 58.

The electronic control 24 delivers a pulse of electrical energy of controlled time duration to a commutator ring 60 in the trigger-distributor unit 26 via conductor 62. A wiper arm 64 secured to shaft 46 is adapted to successively connect the commutator 60 to spaced segments 66 which are respectively connected to solenoids 68 in the injectors 22. The number of segments 66 corresponds to the number of solenoids 68 which in turn may conveniently correspond to the number of cylinders or combustion chamber 14 in engine 12 although this proportion may be increased or decreased as desired. The engine speed compensator 36 is provided with an arm 70 which is secured to shaft 46 in the trigger-distributor unit 26. Arm 70 carries a pair of brushes 72 and 74 which respectively engage slip rings 76 and 78.

As best shown in Figure 3, arm 70 is provided with a cylinder 80 in which is reciprocably mounted a weighted slide member 82 which is urged toward one of its extreme positions by a spring 84. Slide member 82 is provided with an electrical contact 86 which is adapted to engage a slide wire 88 and a resistance wire $R_2$. Slide wire 88 is of negligible resistance and is connected to brush 72. The resistance wire $R_2$ is connected to brush 74 by a conductor 90. The time constant circuit is completed from C through conductor 92, R, conductor 94, slip ring 78, brush 74, resistance wire $R_2$, contact 86, slide wire 88, brush 72, slip ring 76 and conductor 96 to ground or reference potential 98.

With a shaft 46 rotating as a function of engine speed, the weighted member 82 will be thrown outwardly by centrifugal force whereby the resistance $R_2$ will be decreased as engine speed increases. A decrease in resistance tends to reduce the time constant and thus the quantity of fuel injected to the engine. It is to be understood that conductor 90 may be connected to the end of $R_2$ oppositely that shown in Figure 3 whereby the resistance $R_2$ may be increased as engine speed is increased. The resistance $R_2$ may be non-linear or otherwise constructed to produce a desired resistance value for a given position of the slide member 82.

As shown in Figure 1, a throttle body unit 100 is adapted for mounting on the induction passage and is provided with throttle valves 20 mounted on a shaft 102 therein. A throttle lever 104 is secured to shaft 102 and is operatively connected to a conventional accelerator pedal 106 for actuation thereby. A thermostatic control 108 is arranged to position a fast idle cam 110 in the path of lever 104 to prevent the throttle valves from fully closing when the control 108 is cold.

In operation, fuel from tank 10 is placed under pressure by pump 112 and delivered to the injectors 22 through conduit 114. Fuel in excess of that discharged from the injectors 22 is returned to the fuel tank via conduit 116 and restriction 118. The pressure in conduit 114 may be regulated as desired by appropriate means (not shown). The quantity of fuel discharged into the induction passage 18 is controlled by the pressure of fuel in conduit 114 and by the time duration of injector valve opening. The time duration of time opening of injector 22 is determined by the electronic control 24 which is in turn determined by the time constant of the circuit therein. The time constant is varied by varying $R_1$ through the instrumentality of the engine operating condition compensators 28, 30, 32, 34 and 38. The time constant is further varied or modified by the resistance $R_2$ through the instrumentality of the engine speed compensator 36. As engine speed increases the slide member 82 is thrown outwardly varying resistance $R_2$ as engine speed increases.

In the embodiment shown in Figure 5, the parts corresponding to similar parts shown in Figure 3 are designated by corresponding primed numbers. In Figure 5 the resistance wire $R_2'$ is located adjacent the outer end of cylinder 80'. A slide wire 90' of negligible resistance is connected to resistance wire $R_2$ and is located in the cylinder wall 80' so as to be in engagement with the contact 86' during movement of the slide member 82' from its position in cylinder 80' adjacent shaft 46' to a predetermined position in the cylinder. The predetermined position of slider 82' corresponds to a selected predetermined engine speed. In this embodiment the engine speed compensator is ineffective until a predetermined engine speed has been reached wherein slider 82 has moved sufficiently to bring contact 86 into engagement with the resistance wire $R_2'$.

In the embodiment shown in Figure 6 the parts corresponding to similar parts shown in Figures 1 through 4 are designated by double primed corresponding numbers. In Figure 6 the engine speed compensating device 36" is identical to compensating device 36 shown in Figures 1 through 4 with the addition of a shunt circuit 114. The shunt circuit 114 is controlled by a switch 116 which is urged in a direction to close the shunt circuit by a diaphragm 118 which is responsive to induction passage pressure. A spring 120 urges the switch 116 toward open position.

In the operation of the embodiment of the device shown in Figure 6 when the induction passage absolute pressure is low the diaphragm 118 is effective to move switch 116 to close the shunt circuit 114 whereby the engine compensating resistance $R_2$ is effectively removed from the circuit and is of no effect. When the induction passage absolute pressure rises to a predetermined value spring 120 is effective to open switch 116 whereby the resistance $R_2$ is rendered effective to modify the time constant of the electronic control 24.

While the invention has been described in specific embodiments it will be readily apparent to those skilled in the art that many changes and arrangements of parts may be made without departing from the spirit of my invention.

I claim:

1. In a fuel supply system for an internal combustion engine having a source of fuel, a conduit adapted to connect said source with the engine, an electrically actuable valve in said conduit, an electric circuit for said valve, a device in said circuit for controlling the time duration of current flow therethrough, means in said circuit responsive to engine speed adapted to periodically trigger said device, means operatively connected to said device for varying the time duration of current flow independent of the frequency of triggering of said device, and means responsive to engine speed for modifying said last mentioned means to vary said time duration as a function of engine speed.

2. In a fuel supply system for a multi-cylinder internal combustion engine having an induction passage and a source of fuel, a plurality of nozzles, a conduit connecting said nozzles with said source, an electrically actuable valve for each of said nozzles, an electric circuit for said valves, a switch in said circuit adapted to be periodically closed as a function of engine speed, a device in said circuit adapted to be activated when said switch is closed to control the time duration of current flow in said circuit, means responsive to induction passage pressure and insensitive to the frequency of closing of said switch for varying said time duration, and means responsive to engine speed for modifying said last mentioned means to vary said time duration.

3. In a fuel injection system for a multi-cylinder internal combustion engine having an induction passage and a source of fuel, a plurality of nozzles, a conduit connecting said nozzles with said source, an electrically actuable valve for each of said nozzles, an electric circuit for said valves, a device in said circuit energizable to control the time duration of current flow through said circuit, means for periodically energizing said device, means responsive to induction passage pressure operatively connected to said device for varying said time duration of current flow, and means responsive to a predetermined engine speed operatively connected to said device for varying said time duration.

4. In a fuel supply system for a multi-cylinder internal combustion engine having an induction passage and a source of fuel, a plurality of nozzles, a conduit connecting said nozzles with said source, an electrically actuable valve for each of said nozzles, an electric circuit for said valves, a switch in said circuit adapted to be periodically closed as a function of engine speed, a device in said circuit adapted to be activated when said switch is closed to control the time duration of current flow in said circuit, means responsive to induction passage pressure and insensitive to the frequency of closing of said switch for varying said time duration, means responsive to engine speed for modifying said last mentioned means to vary said time duration, and means responsive to a predetermined induction passage pressure for rendering said last mentioned means ineffective.

5. A fuel supply system for a multi-cylinder internal combustion engine having an induction passage, a source of fuel and a source of electric power comprising a nozble for each of said cylinders, conduit means connecting said nozzles to said source of fuel, a normally closed valve in each of said nozzles, a solenoid for each of said valves energizable to open said valves, an electric circuit connecting said solenoids with said source of electric power, a normally non-conducting device in said circuit energizable to permit current flow through said circuit for a controlled time duration, means in said circuit for periodically energizing said device as a function of engine speed, and means operatively connected to said device and responsive to induction passage pressure and engine speed for varying said time duration.

6. In a fuel injection system for a multi-cylinder internal combustion engine having an induction passage and a source of fuel, a plurality of nozzles, a conduit connecting said nozzles with said source, an electrically actuable valve for each of said nozzles, an electric circuit for said valves, a device in said circuit energizable to control the time duration of current flow through said circuit, means for periodically energizing said device, means responsive to induction passage pressure operatively connected to said device for varying said time duration of current flow, and means responsive to engine speed operatively connected to said device for decreasing said time duration as engine speed increases.

No references cited.